(12) United States Patent
Piat et al.

(10) Patent No.: US 11,354,813 B2
(45) Date of Patent: *Jun. 7, 2022

(54) DILATED FULLY CONVOLUTIONAL NETWORK FOR 2D/3D MEDICAL IMAGE REGISTRATION

(71) Applicant: Siemens Healthcare GmbH, Erlangen (DE)

(72) Inventors: Sébastien Piat, Lawrence Township, NJ (US); Shun Miao, Bethesda, MD (US); Rui Liao, Princeton Junction, NJ (US); Tommaso Mansi, Plainsboro, NJ (US); Jiannan Zheng, Delta (CA)

(73) Assignee: Siemens Healthcare GmbH, Erlangen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/030,955

(22) Filed: Sep. 24, 2020

(65) Prior Publication Data

US 2021/0012514 A1 Jan. 14, 2021

Related U.S. Application Data

(63) Continuation of application No. 16/103,196, filed on Aug. 14, 2018, now Pat. No. 10,818,019.

(Continued)

(51) Int. Cl.
*G06T 7/33* (2017.01)
*G06T 15/08* (2011.01)
(Continued)

(52) U.S. Cl.
CPC ............. *G06T 7/33* (2017.01); *G06K 9/6232* (2013.01); *G06T 7/337* (2017.01); *G06T 15/08* (2013.01);
(Continued)

(58) Field of Classification Search
CPC ........... G06T 7/33; G06T 7/337; G06T 15/08; G06T 19/20; G06T 2207/10072;
(Continued)

(56) References Cited

U.S. PATENT DOCUMENTS 7,689,019 B2 3/2010 Boese et al.
8,045,780 B2 10/2011 Boese et al.
(Continued)

OTHER PUBLICATIONS

S. Miao, Z. J. Wang and R. Liao, "A CNN Regression Approach for Real-Time 2D/3D Registration," in IEEE Transactions on Medical Imaging, vol. 35, No. 5, pp. 1352-1363, May 2016, doi: 10.1109/TMI.2016.2521800. (Year: 2016).*

(Continued)

*Primary Examiner* — Nizar N Sivji
*Assistant Examiner* — Umair Ahsan

(57) ABSTRACT

A method and system for 3D/3D medical image registration. A digitally reconstructed radiograph (DRR) is rendered from a 3D medical volume based on current transformation parameters. A trained multi-agent deep neural network (DNN) is applied to a plurality of regions of interest (ROIs) in the DRR and a 2D medical image. The trained multi-agent DNN applies a respective agent to each ROI to calculate a respective set of action-values from each ROI. A maximum action-value and a proposed action associated with the maximum action value are determined for each agent. A subset of agents is selected based on the maximum action-values determined for the agents. The proposed actions determined for the selected subset of agents are aggregated to determine an optimal adjustment to the transformation parameters and the transformation parameters are adjusted by the determined optimal adjustment. The 3D medical volume is registered to the 2D medical image using final transformation parameters resulting from a plurality of iterations.

17 Claims, 8 Drawing Sheets

Related U.S. Application Data

(60) Provisional application No. 62/671,030, filed on May 14, 2018, provisional application No. 62/552,720, filed on Aug. 31, 2017, provisional application No. 62/545,000, filed on Aug. 14, 2017.

(51) Int. Cl.
   *G06T 19/20* (2011.01)
   *G06K 9/62* (2022.01)
   *G06V 10/25* (2022.01)

(52) U.S. Cl.
   CPC .............. *G06T 19/20* (2013.01); *G06V 10/25* (2022.01); *G06T 2207/10072* (2013.01); *G06T 2207/10124* (2013.01); *G06T 2207/20021* (2013.01); *G06T 2207/20081* (2013.01); *G06T 2207/20084* (2013.01); *G06T 2207/30004* (2013.01); *G06T 2219/2004* (2013.01); *G06T 2219/2016* (2013.01)

(58) Field of Classification Search
   CPC . G06T 2207/10124; G06T 2207/20021; G06T 2207/20081; G06T 2207/20084; G06T 2207/30004; G06T 2219/2004; G06T 2219/2016; G06K 9/3233; G06K 9/6232
   USPC ....................................................... 382/132
   See application file for complete search history.

(56) References Cited

U.S. PATENT DOCUMENTS

| | | | |
|---|---|---|---|
| 8,068,654 B2 | 11/2011 | Barbu et al. | |
| 8,457,373 B2 | 6/2013 | Kamen et al. | |
| 8,645,294 B1 | 2/2014 | Owechko et al. | |
| 8,948,487 B2 | 2/2015 | Sundar | |
| 9,495,746 B2 | 11/2016 | Chou et al. | |
| 9,513,107 B2 | 12/2016 | Zweigle et al. | |
| 9,547,902 B2 | 1/2017 | Ionasec et al. | |
| 10,055,838 B2 | 8/2018 | Elenbaas et al. | |
| 10,067,231 B2 | 9/2018 | Zweigle et al. | |
| 2008/0211812 A1 | 9/2008 | Barbu et al. | |
| 2010/0067768 A1 | 3/2010 | Ionasec et al. | |
| 2010/0239153 A1* | 9/2010 | Kuduvalli | G01N 23/04 382/132 |
| 2016/0012592 A1 | 1/2016 | Chou et al. | |
| 2016/0093050 A1 | 3/2016 | Kim et al. | |
| 2017/0024634 A1 | 1/2017 | Miao et al. | |
| 2017/0032245 A1 | 2/2017 | Osband et al. | |
| 2017/0337682 A1 | 11/2017 | Liao et al. | |

OTHER PUBLICATIONS

Bushberg, et al., "The Essential physics of medical imaging", Lippincott, Williams & Wilkins, 2013.

Chou et al., "2D/3D Image Registration Using Regression Learning", Computer Vision and Image Understanding, vol. 117, pp. 1095-1106, 2013.

De Silva et al., "3D-2D Image Registration for Target Localization in Spine Surgery: Investigation of Similarity Metrics Providing Robustness to content mismatch", Phys Med Biol, vol. 61, pp. 3009-3025, 2016.

Deb et al., "A Fast Elitist Multiobjective Genetic Algorithm: NSGA-II", IEEE Transactions on Evolutionary Computation, vol. 6, pp. 182-197, 2002.

Dosovitskiy et al., "FlowNet: Learning Optical Flow with Convolutional Networks", Proceedings of the IEEE International Conference on Computer Vision, pp. 2758-2766, 2015.

Gouveia, et al., "Registration-by-regression of coronary cta and x-ray angiography", Computer Methods in Biomechanics and Biomedical Engineering: Imaging & Visualization; 1-13, 2017.

Hartley et al., "L1 Rotation Averaging Using the Weiszfeld Algorithm", Computer Vision and Pattern Recognition (CVPR), pp. 3041-3048, 2011.

Ilg et al., "FlowNet 2.0: Evolution of Optical Flow Estimation with Deep Networks", arXiv preprint arXiv:1612.01925, 2016.

Jaderberg et al., "Spatial Transformer Networks", Advances in Neural Information Processing Systems, pp. 2017-2025, 2015.

Knaan et al., "Effective Intensity-Based 2D/3D Rigid Registration between Fluoroscopic X-Ray and CT", Medical Image Computing and Computer-Assisted Invervention—MICCAI, pp. 351-358, 2003.

Kruger et al., "Acceleration Techniques for GPU-based Volume Rendering", Proceedings of the 14th IEEE Visualization 2003 (VIS '03), 38 IEEE Computer Society, 2003, 6 pgs.

Lau et al., "A Global Optimization Strategy for 3D-2D Registration of Vascular Images", BMVC, pp. 489-498, 2006.

Liao et al., "An Artificial Agent for Robust Image Registration", AAAI, pp. 4168-5175, 2017.

Long et al., "Fully Convolutional Networks for Semantic Segmentation", Proceedings of the IEEE International Conference on Computer Vision and Pattern Recognition, pp. 3431-3440, 2015.

Maes et al., "Multimodality Image Registration by Maximization of Mutual Information", IEEE Transactions on Medical Imaging, vol. 16, pp. 187-198, 1997.

Markelj et al., "A Review of 3d/2d Registration Methods for Image-Guided Interventions", Medical Image Analysis, pp. 642-661; 2012.

Miao et al., "Toward Accurate and Robust 2-D/3-D Registration of Implant Models to Single-Plane Fluoroscopy", Augmented Reality Environments for Medical Imaging and Computer-Assisted Interventions, Springer, pp. 97-106, 2013.

Miao, et al., "A CNN Regression Approach for Real-Time 2D/3D Registration", IEEE Transactions on Medical Imaging, pp. 1352-1363; 2016.

Mnih et al., "Human-level Control Through Deep Reinforcement Learning", Nature, vol. 518, pp. 529-533, 2015.

Silver et al., "Mastering the Game of Go with Deep Neural Networks and Tree Search", Nature, vol. 529, pp. 484-489, 2016.

Thevenaz et al., "Optimization of Mutual Information for Multi resolution Image Registration", IEEE Transactions on Image Processing, vol. 9, pp. 2083-2099, 2000.

Uneri et al., "Intraoperative Evaluation of Device Placement in Spine Surgery Using Known-Component 3D-2D Image Registration", Phys Med Biol, vol. 62, pp. 3330-3351, 2017.

Van Laarhoven et al., "Simulated An-Nealing", Simulated Annealing: Theory and Applications, Springer, pp. 7-15; 1987.

Varnavas et al., "Fully Automated 2D-3D Registration and Verification", Medical Image Analysis, pp. 108-119, 2015.

Weinzaepfel et al., "DeepFlow: Large Displacement Optical Flow with Deep Matching", Proceedings of the IEEE International Conference on Computer Vision, pp. 1385-1392, 2013.

Wu et al., "Learning-Based Deformable Registration of MR Brain Images", IEEE Transactions on Medical Imaging, vol. 25, pp. 1145-1157, 2006.

Zheng et al., "Learning CNNS with Pairwise Domain Adaption for Real-Time 6Dof Ultrasound Transducer Detection and Tracking from X-Ray Images", Medical Image Computing and Computer-Assisted Intervention, 2017.

\* cited by examiner

DILATED FULLY CONVOLUTIONAL NETWORK FOR 2D/3D MEDICAL IMAGE REGISTRATION

CROSS-REFERENCE TO RELATED APPLICATIONS

This application is a continuation of U.S. patent application Ser. No. 16/103,196, filed Aug. 14, 2018, which claims the benefit of U.S. Provisional Application No. 62/545,000, filed Aug. 14, 2017, U.S. Provisional Application No. 62/552,720, filed Aug. 31, 2017, and U.S. Provisional Application No. 62/671,030, filed May 14, 2018, the disclosures of which are herein incorporated by reference in their entirety.

BACKGROUND OF THE INVENTION

The present invention relates to registration of medical images, and more particularly to automated machine learning based 2D/3D medical image registration.

Medical image registration is an important technology that enables image guided therapy, automated diagnosis imaging, and machine-driven image understanding. 2D/3D medical image registration is used to align a 3D volume, such as a computed tomography (CT) volume or a magnetic resonance imaging (MRI) volume, with a 2D medical image, such as a 2D X-ray image. The goal of 2D/3D medical image registration is to find a six degree of freedom (DoF) pose of a 3D volume (e.g., CT, MRI, etc.) to align its projections with a given 2D medical image. Reliable 2D/3D registration is a key enabler for image-guided surgeries in modern operating rooms. Such 2D/3D medical image registration brings measurement and planning done on pre-operative 3D volumes into the operating rooms and fuses the 3D pre-operative data with intra-operative live 2D X-ray images. For example, the 2D/3D medical image registration can be used to provide augmented guidance for a surgery or to provide navigation for robotic surgery.

2D/3D medical image registration to align a 3D volume to a 2D X-ray image is a challenging problem due to its ill-posed nature and various artifacts presented in 2D X-ray images. Despite a large amount of research being devoted to techniques for performing 2D/3D image registration, it remains a very challenging and unsolved problem, especially in the complex environment of hybrid operating rooms. Accordingly, methods for performing 2D/3D medical image registration with improved accuracy, robustness, and/or efficiency are highly desirable.

BRIEF SUMMARY OF THE INVENTION

The present invention provides a method and system for 2D/3D medical image registration. Embodiments of the present invention provide a dilated fully convolutional network (FCN) for multi-agent 2D/3D medical image registration.

In one embodiment of the present invention, a method for automated computer-based registration of a 3D medical volume of a patient to a 2D medical image of a patient, comprises: rendering a 2D digitally reconstructed radiograph (DRR) from the 3D medical volume based on current transformation parameters; applying a trained multi-agent deep neural network (DNN) to a plurality of regions of interest (ROIs) in the DRR and the 2D medical image, wherein the trained multi-agent DNN applies a respective one of a plurality of agents to each of the plurality of ROIs to calculate a respective set of action-values from each of the plurality of ROIs, and wherein the respective set of action-values calculated from each ROI includes action-values for each of a plurality of possible actions corresponding to predetermined adjustments of the transformation parameters; determining, for each of the plurality of agents based on the respective set of action-values calculated from the corresponding ROI, a maximum action-value from the respective set of action values and a proposed action associated with the maximum action value from the plurality of possible actions; selecting a subset of agents from the plurality agents based on the maximum action-values determined for the plurality of agents; aggregating the proposed actions determined for the selected subset of agents to determine an optimal adjustment to the transformation parameters and adjusting the transformation parameters by the determined optimal adjustment to the transformation parameters; repeating the rendering, applying, determining, selecting, aggregating steps for a plurality of iterations; and registering the 3D medical volume to the 2D medical image using final transformation parameters resulting from the plurality of iterations.

In an embodiment, the plurality possible actions include positive and negative translations of along x, y, and z axes by a predetermined amount and positive and negative rotations about the x, y, and z axes by a predetermined amount.

In an embodiment, the trained multi-agent DNN is trained to estimate, for each of the plurality of ROIs, action-values corresponding to a reduction of a distance between a current transformation and a ground truth transformation resulting from each of the plurality of possible action.

In an embodiment, the trained multi-agent DNN is a fully convolutional network (FCN) policy network comprising an encoder FCN and a decoder FCN, and applying a trained multi-agent deep neural network (DNN) to a plurality of regions of interest (ROIs) in the DRR and the 2D medical image comprises: inputting the DRR and the 2D medical image to the encoder FCN; encoding, by the encoder FCN, the plurality of ROIs in the DRR into a first dense feature vector map, wherein each of the plurality of ROIs in the DRR is encoded into a corresponding feature vector in the first dense feature vector map; encoding, by the encoder FCN, the plurality of ROIs in the 2D medical image into a second dense feature vector map, wherein each of the plurality of ROIs in the 2D medical image is encoded into a corresponding feature vector in the second dense feature vector map; concatenating the first and second dense feature vector maps and inputting the concatenated first and second dense feature vector maps to the decoder FCN; and decoding, by the decoder FCN, a respective concatenated feature vector corresponding to each of the plurality of ROIs to calculate the respective set of action-values from each of the plurality ROIs, and outputting an estimated reward map that includes the respective set of action-values calculated from each of the plurality of ROIs.

In an embodiment, the plurality of ROIs in the DRR and the 2D medical image include a plurality of densely overlapping ROIs in the DRR and the 2D medical image.

In an embodiment, the plurality of densely overlapping ROIs in the DRR and the 2D medical image include a respective ROI centered at each pixel location in the DRR and the 2D medical image.

In an embodiment, the FCN policy network is trained based on a plurality of training image pairs by applying, for each training image pair, N random 2D shifts to the first feature vector map to simulate translations of a 3D volume in an imaging plane, determining a Euclidean loss between a ground truth reward map and the estimated reward map output from the decoder FCN for each 2D shift, and learning parameters of the encoder FCN and the decoder FCN to minimize a total Euclidean loss for all of the 2D shifts.

In an embodiment, selecting a subset of agents from the plurality agents based on the maximum action-values determined for the plurality of agents comprises: selecting a subset of agents having a top predetermined percentage of maximum action-values.

In an embodiment, selecting a subset of agents having a top predetermined percentage of maximum action-values comprises: selecting the subset of agents with maximum-action values ranking in the top 25%.

In an embodiment, aggregating the proposed actions determined for the selected subset of agents to determine an optimal adjustment to the transformation parameters comprises: determining a geodesic mean of the proposed actions determined for the selected subset of agents.

In another embodiment of the present invention, an apparatus for automated computer-based registration of a 3D medical volume of a patient to a 2D medical image of a patient comprises: a processor and a memory storing computer program instructions, which when executed by the processor cause the processor to perform operations comprising: rendering a 2D digitally reconstructed radiograph (DRR) from the 3D medical volume based on current transformation parameters; applying a trained multi-agent deep neural network (DNN) to a plurality of regions of interest (ROIs) in the DRR and the 2D medical image, wherein the trained multi-agent DNN applies a respective one of a plurality of agents to each of the plurality of ROIs to calculate a respective set of action-values from each of the plurality of ROIs, and wherein the respective set of action-values calculated from each ROI includes action-values for each of a plurality of possible actions corresponding to predetermined adjustments of the transformation parameters; determining, for each of the plurality of agents based on the respective set of action-values calculated from the corresponding ROI, a maximum action-value from the respective set of action values and a proposed action associated with the maximum action value from the plurality of possible actions; selecting a subset of agents from the plurality agents based on the maximum action-values determined for the plurality of agents; aggregating the proposed actions determined for the selected subset of agents to determine an optimal adjustment to the transformation parameters and adjusting the transformation parameters by the determined optimal adjustment to the transformation parameters; repeating the rendering, applying, determining, selecting, aggregating steps for a plurality of iterations; and registering the 3D medical volume to the 2D medical image using final transformation parameters resulting from the plurality of iterations.

In another embodiment of the present invention, a non-transitory computer readable medium stores computer program instructions for automated computer-based registration of a 3D medical volume of a patient to a 2D medical image of the patient. The computer program instructions, when executed by a processor, cause the processor to perform operations comprising: rendering a 2D digitally reconstructed radiograph (DRR) from the 3D medical volume based on current transformation parameters; applying a trained multi-agent deep neural network (DNN) to a plurality of regions of interest (ROIs) in the DRR and the 2D medical image, wherein the trained multi-agent DNN applies a respective one of a plurality of agents to each of the plurality of ROIs to calculate a respective set of action-values from each of the plurality of ROIs, and wherein the respective set of action-values calculated from each ROI includes action-values for each of a plurality of possible actions corresponding to predetermined adjustments of the transformation parameters; determining, for each of the plurality of agents based on the respective set of action-values calculated from the corresponding ROI, a maximum action-value from the respective set of action values and a proposed action associated with the maximum action value from the plurality of possible actions; selecting a subset of agents from the plurality agents based on the maximum action-values determined for the plurality of agents; aggregating the proposed actions determined for the selected subset of agents to determine an optimal adjustment to the transformation parameters and adjusting the transformation parameters by the determined optimal adjustment to the transformation parameters; repeating the rendering, applying, determining, selecting, aggregating steps for a plurality of iterations; and registering the 3D medical volume to the 2D medical image using final transformation parameters resulting from the plurality of iterations.

These and other advantages of the invention will be apparent to those of ordinary skill in the art by reference to the following detailed description and the accompanying drawings.

DETAILED DESCRIPTION

The present invention relates to computer-based 2D/3D medical image registration. Embodiments of the present invention are described herein to give a visual understanding of the image registration methods. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system or available through a network system.

Figure 1:
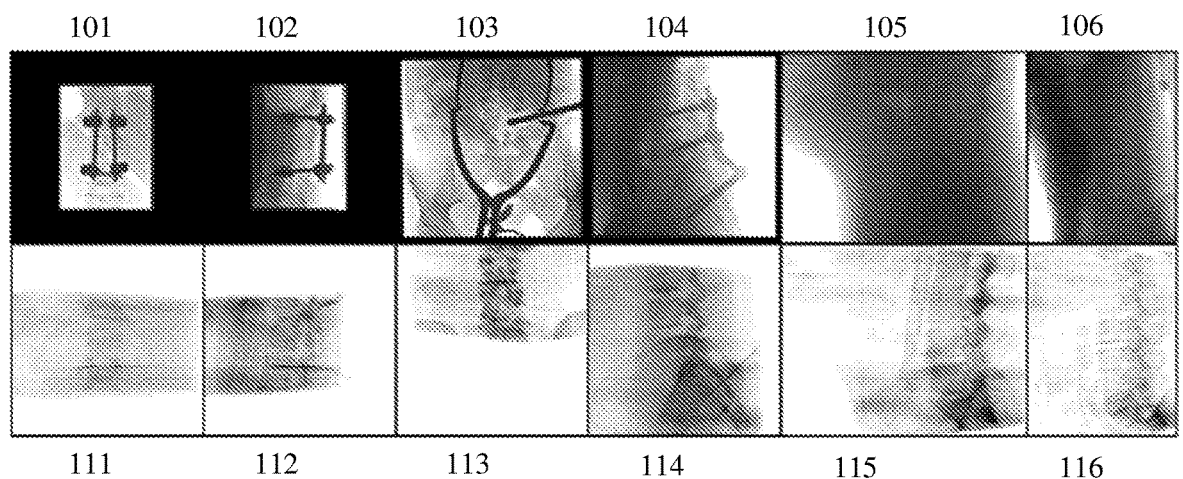
FIG. 1 illustrates exemplary X-ray images that present challenges to optimization-based 2D/3D registration techniques.

The goal of 2D/3D image registration is to find the 6 degree of freedom (DoF) pose of a 3D volume (e.g., computed tomography (CT), magnetic resonance imaging (MRI), etc.) to align its projections with given 2D medical images (e.g., 2D X-ray images. Reliable 2D/3D registration is a key enabler for image-guided surgeries in modern operating rooms. 2D/3D image registration to align a 3D volume and 2D X-ray images is a challenging problem due to its ill-posed nature and various artifacts presented in 2D X-ray images. Most existing techniques for 2D/3D registration of medical images are centered around optimization-based formulation. Since the cost functions to be optimized in such techniques are highly non-convex especially on images with a low signal-to-noise ratio (SNR) and/or severe image artifacts and occlusions, optimization-based methods are typically very sensitive to the starting position, resulting in a very small capture range. FIG. 1 illustrates exemplary X-ray images that present challenges to optimization-based 2D/3D registration techniques. FIG. 1 shows X-ray images 101, 102, 103, 104, 105, and 106 and corresponding digitally reconstructed radiographs (DRRs) 111, 112, 113, 114, 115, and 116, respectively. X-ray images 101, 102, 103, and 104 are clinical data from spin surgery that contain various highly opaque metal objects and have very different field-of-views (FOVs). X-ray images 105 and 106 are from rotational run spine data that are used to reconstruct cone-beam CT spine volumes and have a relatively low SNR due to a very small dynamic capture range. Recent studies have investigated regression-based methods to increase the capture range of 2D/3D registration. However, these methods are limited to registering only highly opaque objects with a fixed shape described by a computer-aided design (CAD) model, and therefore cannot solve 2D/3D registration of anatomical structures with varying shapes across patients.

An artificial agent-based formulation for image registration was introduced for 3D/3D registration by some of the present inventors in Liao et al., "An Artificial Agent for Robust Image Registration", *Proceedings of the Thirty-First AAAI Conference on Artificial Intelligence (AAAI-17)*, pp. 4168-4175, 2017 (hereinafter referred to as "Liao et al. 2017"), and resulted in significantly improved robustness for 3D/3D medical image registration. However, the artificial agent-based formulation in Liao et al. 2017 has major limitations that make it ineffective for 2D/3D registration in a clinical setup. First, it requires the rough location and size of the target object to be registered as a prior, in order to extract a local region around the target object as the agent's observation. However, in 2D/3D registration, the location and size of the target object can vary significantly in 2D X-ray images due to variations in C-arm geometry and imaging protocols such as collimation factors. Second, there could be various artifacts or interference coming from medical devices in the 2D X-ray images and simulation of all possible artifacts/inference in the training samples is not practical. Accordingly, the present inventors have recognized the need for an auto attention mechanism in order to be able to inherently detect the regions with more reliable visual cues to drive the registration. Such a mechanism is not provided in Liao at al. 2017. Third, the training data need to be sampled extensively from the registration environment with a high degree of freedom (DoF) (i.e., environmental DoFs include the location of the agent's observation and pose of the 3D volume), which is associated with a high computational cost. In fact, five million samples are needed as reported in Liao et al. 2017, even after using location prior knowledge to reduce the DoF by three. Since data sampling grows exponentially with the DoF, without the location prior knowledge, the computational cost would be prohibitively high for 2D/3D registration.

Embodiments of the present invention provide a multi-agent system for 2D/3D medical image registration with an auto attention mechanism that addresses the three limitations described above of the agent-based registration. The present inventors have successfully applied the multi-agent registration method to a challenging 2D/3D registration application for minimally invasive spine surgery. According to an advantageous embodiment of the present invention, multiple artificial agents are applied to observe multiple regions of the X-ray image and corresponding DRR generated from the 3D volume, and the method adaptively favors action proposals from regions with more distinct visual cues for registration. Embodiments of the present invention utilize a policy network architecture with separate encoding of the fixed and moving images, and a dilated fully convolutional network (FCN) based training strategy to train all observation regions in each back propagation. This FCN training strategy significantly reduces the DoFs of the registration environment, and as a result, training efficiency is improved by one order of magnitude as compared to a CNN-based training method. The proposed FCN structure also supports the multi-agent based registration in the application phase for efficient 2D/3D registration. The present inventors have tested the multi-agent 2D/3D registration method described herein and have demonstrated that the method achieves high robustness on both rotational run spine data with a low SNR (99.2% success rate on 1,600 test cases from 16 patients) and data from minimally invasive spine surgery where severe image artifacts and occlusions are presented due to metal screws and guide wires (94.6% success rate on 480 test cases from 28 patients), significantly outperforming the single-agent based method and other state-of-the-art optimization-based methods.

As used herein, the term "agent" refers to an intelligent artificial agent that is implemented on one or more computers or processors by executing computer program instructions (code) loaded into memory. Such as agent observes its environment (i.e., the medical images to be registered) and autonomously acts on that environment to register the images using a registration strategy (herein referred to as a "policy") learned using machine learning. Embodiments of the present invention train a deep neural network (DNN) to perform multi-agent 2D/3D medical image registration. Whereas a single agent uses a trained DNN to evaluate a region of interest (ROI) of the images to be registered iteratively predict actions to be performed to register the images, the multi-agent 2D/3D registration uses the trained DNN to evaluate multiple ROIs in the images to be registered and predict respective actions to register the images corresponding to each of the ROIs. That is the multi-agent 2D/3D registration generates predicted registration actions from multiple agents simultaneously, where each agent predicts a respective action based on a corresponding one of the ROIs.

Embodiments of the present invention formulate the 2D/3D registration problem as a Markov Decision Process (MDP) with observations, actions, and rewards defined with respect to X-ray imaging systems. To handle various artifacts in 2D X-ray images, embodiments of the present invention efficiently apply multiple local agents via an FCN-based deep learning architecture and utilize an auto attention mechanism to favor proposals from regions with more reliable visual cues. Embodiments of the present invention utilize a dilated FCN-based training mechanism to significantly reduce the DoF in the simulation of the registration environment, and thereby drastically improve the training efficiency by an order of magnitude as compared with a CNN-based training method.

Figure 2:
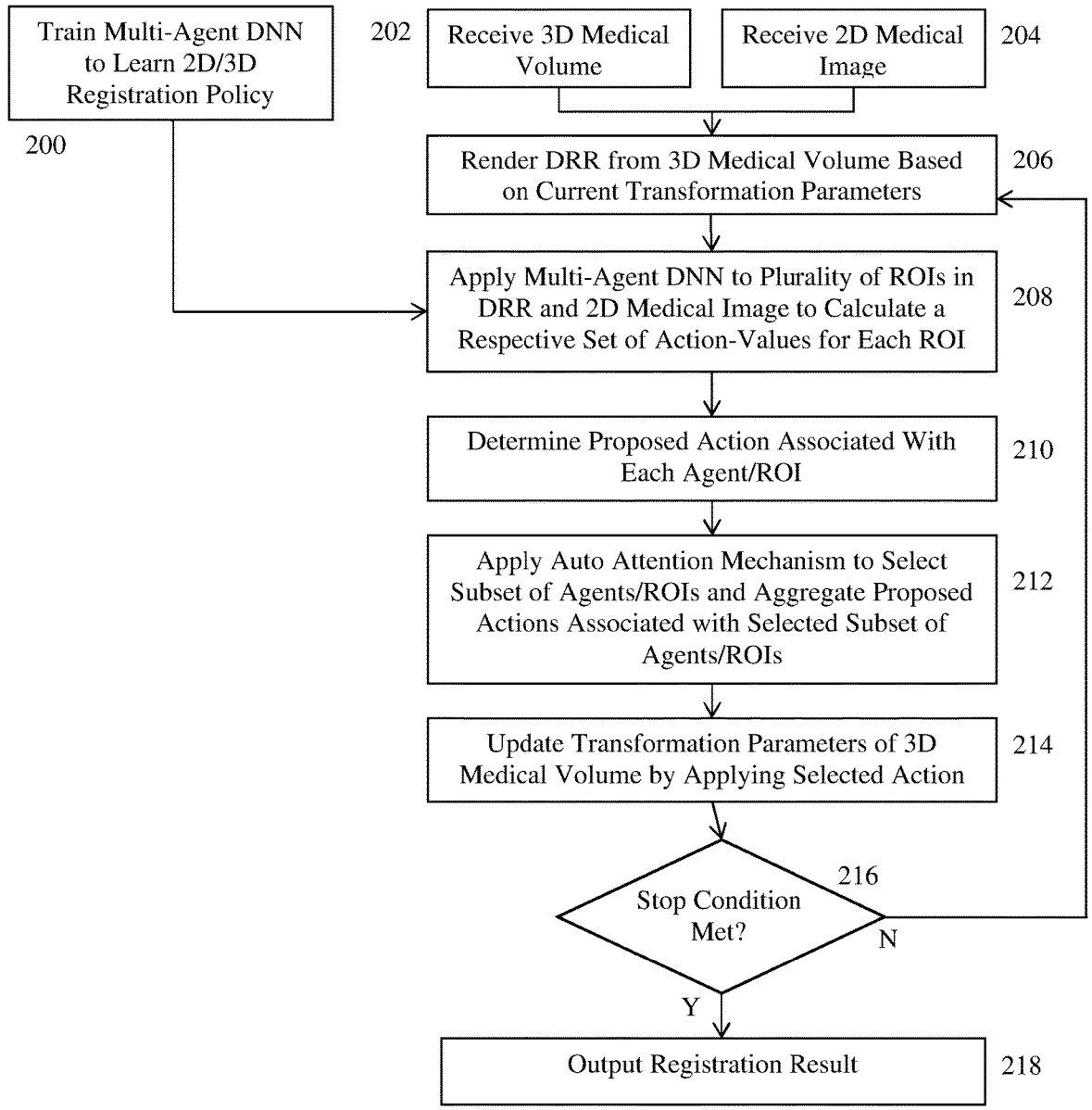
FIG. 2 illustrates a method for 2D/3D medical image registration according to an embodiment of the present invention.

FIG. 2 illustrates a method for 2D/3D medical image registration according to an embodiment of the present invention. At step 200 of FIG. 2, a multi-agent deep neural network (DNN) is trained to learn a 2D/3D registration policy. Step 200 is performed in an offline training stage prior to the on-line 2D/3D image registration for newly input/received medical images performed in steps 202-218.

Given a 3D CT volume $J: \mathbb{R}^3 \to \mathbb{R}$, a 2D projection image can be calculated following the X-ray imaging model:

$$H_T(p) = \int J(T^{-1} \circ L(p,r)) dr, \quad (1)$$

where $H_T(p)$ is the intensity of the synthetic X-ray image at point p, L(p,r) is the line connecting the X-ray source and the point p, parameterized by r, and $T: \mathbb{R}^3 \to \mathbb{R}$ is the transformation from the 3D volume. Such a 2D projection image is referred to as a digitally reconstructed radiograph (DRR) and can be computed using the well-known Ray-Casting algorithm.

In 2D/3D registration problems, a 3D volume $J(\cdot)$, a 2D X-ray image $I(\cdot)$, and the camera model $L(\cdot)$ are given. The goal is to find the transformation T that aligns the projection of the 3D volume $H_T(\cdot)$ with the X-ray image $I(\cdot)$. Due to the ambiguity of matching the 3D volume with a single projected 2D image, multiple X-ray images may be employed in the 2D/3D registration. In such cases, the goal is to find the transformation T that aligns all DRR and X-ray image pairs, denoted as $H_{i,T}(\cdot)$ and $I_i(\cdot)$, where i denotes the index of the X-ray image.

Special Euclidean group SE(3) is the set of 4×4 matrices corresponding to translations and rotations. The tangent space of SE(3) is described using the Lie algebra se(3), which has six generators corresponding to the derivatives of translation and rotation along/around each of the standard axes. An element of se(3) is then represented by multiples of the generators:

$$\delta = (u,v) \in \mathbb{R}^6, \quad (2)$$

$$\delta_x = u_1 G_1 + u_2 G_2 + u_3 G_3 + v_1 G_4 + v_2 G_5 + v_3 G_6 \in se(3), \quad (3)$$

where $(G_1, G_2, G_3)$ are the translation generators and $(G_4, G_5, G_6)$ are the rotation generators. We write $\delta \in se(3)$ as a 6-vector of the coefficients, and use $\delta_x$ corresponding matric generator with the coefficients. Elements in se(3) can be taken into SE(3) via exponential map:

$$T = \exp(\delta_x) \in SE(3). \quad (4)$$

According to an advantageous embodiment, the problem of finding T to align the DRR $H_T(\cdot)$ with an X-ray image $I(\cdot)$ is cast as a Markov Decision Process (MDP), which is defined by a 5-tuple $\{\mathcal{T}, \mathcal{A}, P(\cdot), R(\cdot), \gamma\}$, where $\mathcal{T}$ is the set of possible states (i.e., transformations in SE(3)), $\mathcal{A}$ is the set of actions (i.e., modifications of the transformation, $P_A(T)$ is the state obtained by taking action A in states T, $R_A(T)$ is the reward received by taking action A in state T, and $\gamma$ is the discount factor that controls the importance of future rewards. With the action space $\mathcal{A}$ and the reward scheme defined, the core problem of MDP is to find a policy $\pi(\cdot)$ that specifies the optimal action $\pi(T_t)$ to be taken at state $T_t$ to maximize the long term reward:

$$\Sigma_{t=0}^{inf} \gamma^t R_{A_t}(T_t), \text{ where we choose } A_t = \pi(T_t). \quad (5)$$

Figure 3:
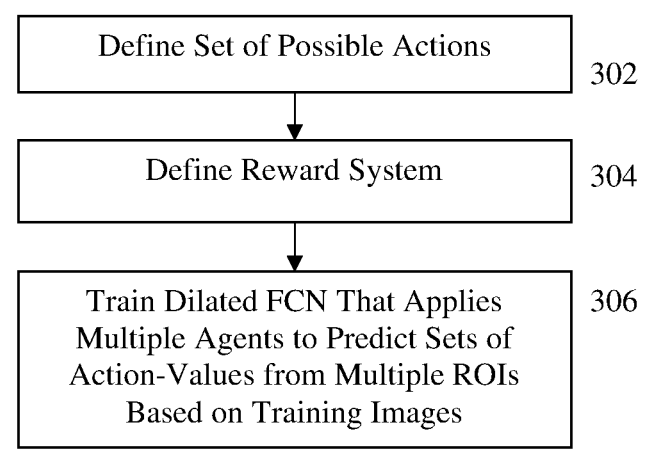
FIG. 3 illustrates a method of training a multi-agent deep neural network (DNN) to learn a 2D/3D registration policy according to an embodiment of the present invention.

FIG. 3 illustrates a method of training a multi-agent DNN to learn a 2D/3D registration policy according to an embodiment of the present invention. The method of FIG. 3 can be used to implement the training phase 200 of FIG. 2. Referring to FIG. 3, at step 302, a set of possible actions are defined for the 2D/3D medical image registration. In order to define the possible actions that can be selected by an agent, global and local coordinate systems can first be defined. The global coordinate system is based on the 2D X-ray imaging plane. In an advantageous implementation, the global coordinate system is defined with the origin at the upper left corner of the X-ray image, the x and y axes are along the image edges, and the z axis is perpendicular to the X-ray image. The local coordinate system has the same orientation as the global coordinate system. The origin of the local coordinate system in the 3D volume can be as the "location of the agent," which needs to be selected and is used to define a region of interest (ROI) associated with the agent. Examples of the global coordinate system 402 and the local coordinate system 404 can be seen in FIG. 4. The coordinate transform from the global coordinate system to the local coordinate system is denoted as E. The transformation $T_t$ is represented in E, written as $E \circ T_t$, and the actions are defined to be small movements in the tangent space of SE(3). With the tangent space of SE(3) parameterized by a 6-vector of se(3), 12 possible actions as positive and negative movements along the 6 generators of se(3):

$$\mathcal{A} = \{-\lambda_1 G_1, \lambda_1 G_1, \ldots, -\lambda_6 G_6, \lambda_6 G_6\}, \quad (6)$$

where $\lambda_i$ is the step size for the action along the generator $G_i$. Application of an action $A \in \mathcal{A}$ is represented as:

$$T_{t+1} = E^{-1} \circ \exp(A) \circ E \circ T_t. \quad (7)$$

The 3 translation vectors $G_{1,2,3}$ correspond to translations along the basis axes (x, y, z) by 1 mm, and the 3 rotation generators $G_{4,5,6}$ correspond to rotation with respect to the basis axes by 1 radian. The actions can be set with a relatively small step size. For example, in an advantageous implementation, $\lambda_1$, $\lambda_2$, and $\lambda_3$ are each set to be 1 to have a 1 mm translation step size and $\lambda_4$, $\lambda_5$, and $\lambda_6$ are each set to be 0.0174 to have a 1 degree rotation step size. Accordingly, in an advantageous implementation, the 12 possible actions include adjusting the translation along the x, y, or z axis by ±1 mm, and adjusting the rotation about the x, y, or z axis by ±1 degree.

At step 304, a reward system is defined. In standard MPD, the optimization target is a long term reward, i.e., an accumulation of discounted future reward, due to the difficulty of forging a reward system that directly associates the immediate reward with the long term goal. For 2D/3D registration, however, a distance-based reward system can be defined such that the immediate reward is tied with the improvement of the registration. According to an advantageous embodiment, the reward scheme is defined as the reduction of distance to the ground truth transformation:

$$R_A(T) = D(T, T_g) - D(T', T_g), \quad (8)$$

where T is the transformation before the action, T' is the transformation after the action, and $T_g$ is the ground truth transformation. The distance metric $D(\cdot, \cdot)$ is defined as the geodesic distance of two transformations on SE(3):

$$D(T_1, T_2) = \|\log(T_2 \circ T_1^{-1})\|_F = (2\|u\|_2^2 + \|v\|_2^2)^{1/2}, \quad (9)$$

Where $\log(\cdot)$ takes $T_2 \circ T_1^{-1} \in SE(3)$ into se(3), and u and v are rotation and translation coefficients of $\log(T_2 \circ T_1^{-1})$ as described in Equation (2). Because the units for rotation and translation are radian and mm, respectively, the distance impact of rotation is too small relative to the impact of translation. Therefore, the rotation coefficients v are scaled by 180/π to balance the impacts of rotation and translation. Since the distance $D(T,T_g)$ measures the distance to the ground truth transformation, a greedy policy that maximizes the immediate reward (i.e., minimizes the distance to the ground truth) will lead to the correct registration action, such that:

$$\pi(T) = \underset{A}{\operatorname{argmax}} R_A(T). \qquad (10)$$

This can also be considered to be a special case of MPD with the discount factor γ=0. Accordingly, given a current state of the transformation T, an action value (reward) is determined for each action in the set of possible actions that represents the reduction of the distance between the current transformation and the ground truth transformation if the transformation is adjusted by that action.

At step 306, a dilated fully convolutional network (FCN) that applies multiple agents to predict sets of action values corresponding to the possible actions from multiple ROIs is trained based on training images with known ground truth transformations. A core problem is to learn the optimal 2D/3D registration policy described in Equation (10). In Deep Reinforcement Learning (DRL), the optimal action-value function is modeled as a DNN and learned via extensive environment exploration. According to an advantageous embodiment of the present invention, since the 2D/3D registration utilizes a greedy policy that only accounts for the immediate reward, the reward function is modeled as a DNN, which can be learned much more efficiently via supervised learning. An example of such a DNN is shown in FIG. 4.

Figure 4:
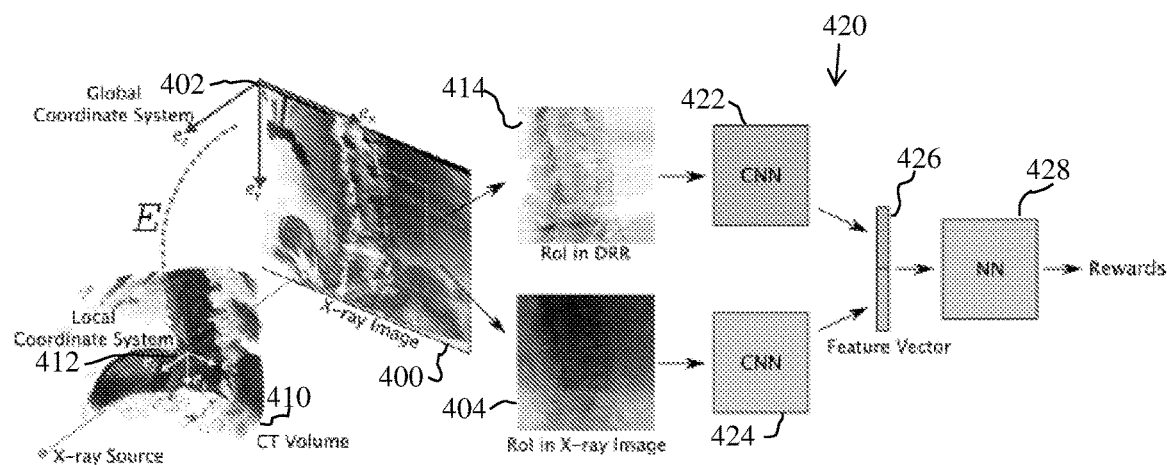
FIG. 4 illustrates an exemplary single agent DNN that is trained to learn 2D/3D registration policy according to an embodiment of the present invention.

FIG. 4 illustrates an exemplary single agent DNN that is trained to learn 2D/3D registration policy according to an embodiment of the present invention. As shown in FIG. 4, the DNN 420 includes convolutional neural network (CNN) encoders 422 and 424 and a neural network (NN) decoder 428. Starting with an X-ray image 400 and a CT volume 410, the network 420 takes a ROI in the X-ray image 404 and a corresponding ROI in a DRR 414 as input and encodes them separately to feature vectors via the CNN encoders 422 and 424, respectively. The feature vectors output from the CNN encoders 422 and 424 are concatenated into a concatenated feature vector 426, which is input to the decoder 428. The decoder 428 decodes the concatenated feature vector 426 to corresponding estimated rewards. In particular, the decoder 426 outputs an estimated/predicted action-value for each action in the set of possible actions. The ROI in the X-ray image and the DRR corresponds to the agent's observation region. The ROI is centered on the agent's location, with a fixed size in the number of pixels and pixel spacing (e.g., 61×61 pixels and 1.5 mm×1.5 mm pixel spacing in an exemplary implementation). It is important to center the ROI on the agent's location because it ensures that the rotation actions rotate the image around the center of the ROI, which is a key to make the reward learnable. In the network 420 of FIG. 4, the CNN encoders 422 and 424 have the same structure. Detailed layer configuration of the encoder is shown in Table 1. The decoder 428 can be implemented using a network with three fully connected layers.

TABLE 1

| | Layer Name | Output Name | Original CNN | Equivalent FCN |
|---|---|---|---|---|
| Encoder | input | 61 × 61 | — | — |
| | conv1 | 59 × 59 | 3 × 3 × 32 | 3 × 3 × 32 |
| | conv2 | 57 × 57 | 3 × 3 × 32 | 3 × 3 × 32 |
| | conv3 | 27 × 27 | 3 × 3 × 64, s2 | 3 × 3 × 64, d2 |
| | conv4 | 25 × 25 | 3 × 3 × 64 | 3 × 3 × 64, d2 |
| | conv5 | 11 × 11 | 3 × 3 × 128, s2 | 3 × 3 × 128, d4 |
| | conv6 | 9 × 9 | 3 × 3 × 128 | 3 × 3 × 128, d4 |
| | conv7 | 3 × 3 | 3 × 3 × 256, s2 | 3 × 3 × 256, d8 |
| | fc1 | 1 × 1 | 1024 | 3 × 3 × 1024, d8 |
| | fc2 | 1 × 1 | 1024 | 1 × 1 × 1024, d8 |
| | output | 1 × 1 | 128 | 1 × 1 × 128, d8 |
| Decoder | input | 1 × 1 | — | — |
| | fc1 | 1 × 1 | 1024 | 3 × 3 × 1024, d8 |
| | fc2 | 1 × 1 | 1024 | 1 × 1 × 1024, d8 |
| | output | 1 × 1 | 6 | 1 × 1 × 6, d8 |

Table 1 shows configurations for the encoder/decoder CNNs and their equivalent FCNs (described below). Parameters for the convolutional layers are written as m×n×f, where n×m is the convolutional kernel size, and f is the number of feature maps. sk indicates that the layer has a stride of k, and dk indicates that the filter kernel is dilated k times. All convolutional layers have zero padding. SELU activation function is applied for all layers except the input and output layers. The column "output size" specifies the output sizes for the CNN layers.

One way to train the DNN is to employ a regular CNN and train it with data randomly sampled from the environment. The raw training data are pairs of 2D/3D images with known ground truth transformations. From each 2D/3D data pair, the environment has 8 DoFs, i.e., 2 DoFs for the (x,y) of the agent's location (z is set to be the mid-point of the 3D volume), and 6 DoFs for the transformation T. To generate one training sample, which includes a pair of ROIs from the X-ray image and DRR and ground truth rewards (action-values), both the 2 DoF E and the 6 DoF T must be sampled. Since the ground truth transformation $T_g$ is known, the ground truth rewards (action-values) for each action can be calculated following Equation (8) and used as the label for supervised learning. Although training the CNN on data samples from the environment is theoretically sound, it highs a very high computational cost due to the high DoF of the environment for the 2D/3D registration problem.

According to an advantageous embodiment of the present invention, to address the high DoF of the environment, a FCN-based method is used to train the network, which samples data from only 4 DoFs of the environment (i.e., rotations, and depth of the 3D volume). To make the encoder CNN convertible to a FCN, the encoder CNN: 1) has no pooling layers, 2) has no padding, and 3) has feature maps before stride with a size of N×stride_size+1. With these properties, the encoder CNN can be modeled exactly as a FCN with configuration shown in Table 1. To obtain a dense prediction from the FCN, filter dilation is employed as follows: if a convolutional layer has input stride s, the input stride is removed in the FCN and the filter kernel is enlarged by s times and rarified s times. The decoder with only fully connected layers can be converted to an FCN with 1×1 convolutions.

Figure 5:
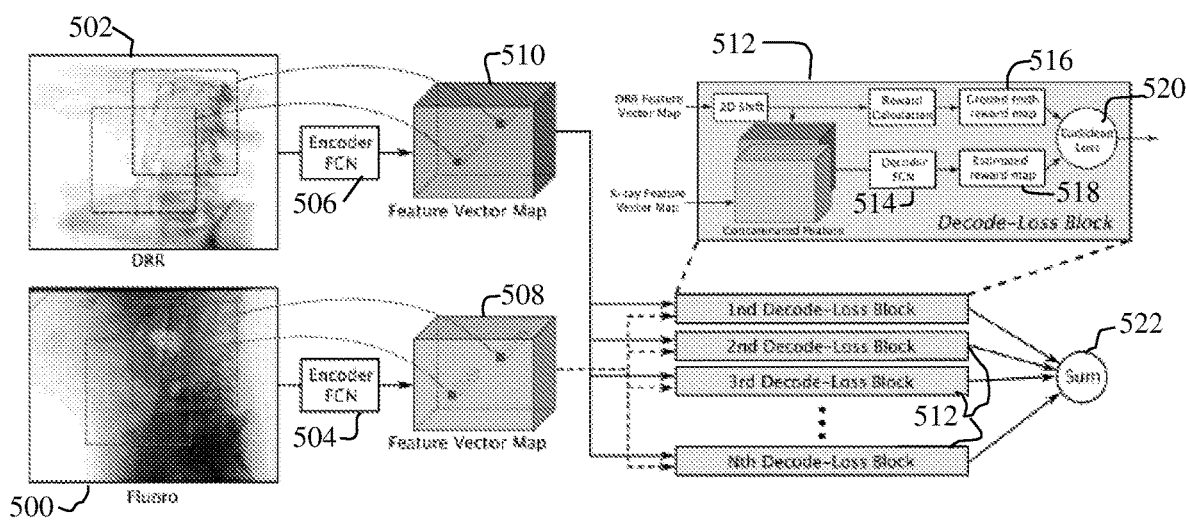
FIG. 5 illustrates training a multi-agent reward network using a dilated fully convolutional network (FCN) according to an embodiment of the present invention.

With both the encoder and decoder modeled as FCN, the network can be trained much more efficiently. FIG. 5 illustrates training a multi-agent reward network using a dilated FCN according to an embodiment of the present invention. As shown in FIG. 5, the whole X-ray (fluoro) 500 and DRR 502 images are input to the encoder FCN 504/506, which outputs two dense feature maps 508 and 510 with each feature vector in the feature vector map 508/510 corresponding to a predetermined size (e.g., 61×61 pixels) ROI. In other words, densely overlapping ROIs in the X-ray image 500 and the DRR 502 are encoded to dense feature vector maps 508 and 510. In and advantageous implementation, the feature vector maps 508 and 510 include feature vectors corresponding to ROIs centered at each pixel of the X-ray image 500 and the DRR 502. Given an ROI in 2D, its corresponding agent location can be obtained by back propagating the center of the region to the 3D volume. Accordingly, by since each ROI corresponds to an observed region of a respective agent, the FCN-based network simultaneously applies multiple agents, which compute action-values for the set of actions based on corresponding ones of the densely overlapping ROIs.

In training, the DDR feature vector map is randomly shifted N times to simulate translations of the 3D volume in the imaging plane. As shown in FIG. 5, N decode-loss blocks 512 are used to compute the Euclidean loss between estimated and ground truth reward maps calculated from each of the N shifts. In each decode-loss block 512, a random 2D shift t is performed on the DRR feature vector map 510 to achieve the effect of an in-plane translation of T. Given the current transformation T, the 2D shift t, and $\{G_i\}$, the ground truth rewards for the densely overlapping ROIs are calculated following Equation (8), and used as supervision to train the FCN encoder and decoder. The calculation of the ground truth rewards, for the densely overlapping ROIs results in a ground truth reward map 516 that includes a respective set of ground truth action-values for each of the ROIs. The decoder FCN 514 inputs the X-ray feature vector map and the shifted DRR feature vector map and outputs an estimate reward map 518. The FCN decoder 514 decodes the feature vectors corresponding to each of the densely overlapping ROIs in X-ray feature vector map and the shifted DRR feature vector map, and outputs an estimated/predicted set of action-values for the set of actions from each ROI. The estimated reward map 518 includes the respective set of estimated action-values for each of the ROIs. In an advantageous implementation, each location in the estimated reward map 518 corresponds to a respective ROI centered at the corresponding pixel location in the X-ray image and the DRR image, and the estimated reward map 518 has 12 channels corresponding to the 12 possible actions such that the estimated reward map includes a set of 12 estimated action-values for each of the ROIs. At 520, the Euclidean loss is calculated between the ground truth reward map 516 and the estimated reward map 518. In particular, the Euclidean loss is calculated between the estimated and ground truth action-values over all of the densely overlapping ROIs. At 522, the Euclidean loss from each of the N decode-lose blocks 512 corresponding to the N random shifts is summed. Back-propagation is used to learn network parameters (weights) for the encoder FCN and decoder FCN that minimize the total loss between the ground truth and estimated reward maps for the N random shifts over the set of training samples. Accordingly, multiple agents corresponding to the multiple observation regions (ROIs) are trained together in each back propagation.

Figure 6:
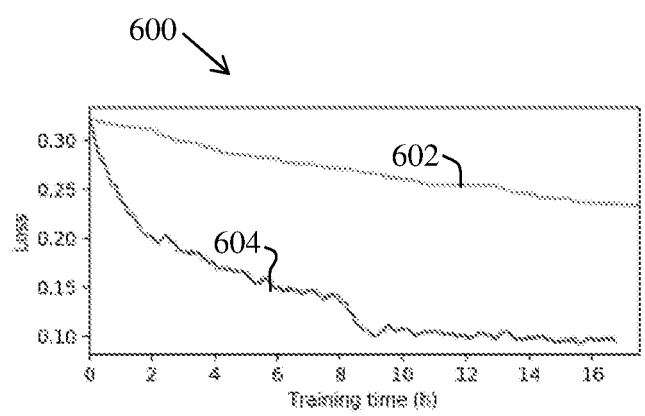
FIG. 6 illustrates a comparison of training speed using convolutional neural network (CNN) training and dilated FCN training.

Training via FCN reduces the 4 DoFs of the registration environment corresponding to the location of the agent and the in-plane translations of the 3D volume. In particular, by encoding densely overlapping ROIs, ROIs from different G are already covered, thus eliminating the need for sampling G during training. In addition, using the 2D shift of the DRR feature map to achieve in-plane translation effects, the transformation T does not need to be sampled for translations along the x and y axes. Since the complexity of the registration environment grows exponentially with its DoF, reducing the DoF by 4 significantly improves the training efficiency by an order of magnitude, as shown in FIG. 6. FIG. 6 illustrates a comparison of training speed using CNN training and dilated FCN training. As shown in graph 600 of FIG. 6, the training loss function is minimized significantly faster in the dilated FCN training 604 than in the CNN training 602.

Once the dilated FCN network (including the FCN encoder and FCN decoder) is trained, the trained FCN network can be stored on a memory or storage device of a computer system and used for performing 2D/3D registration on newly received medical images.

Returning to FIG. 2, at step 202, a 3D medical volume of a patient is received. In an advantageous embodiment, the 3D medical volume may be a CT volume, but the present invention is not limited thereto and other types of medical imaging modalities (e.g., MRI, positron emission tomography (PET), Ultrasound, etc.) can be used to acquire the 3D medical volume. In a possible embodiment, the 3D medical volume can be pre-operative volume acquired in a pre-operative scan of the patient. The 3D medical volume can be received directly from an image acquisition device (e.g., CT scanner, MRI scanner, etc.) used to acquire the 3D volume, or can be received by loading a previously stored 3D volume of the patient.

At step 204, a 2D medical image of the patient is received. In an advantageous embodiment, the 2D medical image is an X-ray image of the patient, but the present invention is not limited thereto. In a possible embodiment, the 2D medical image can be an intra-operative image used to guidance for a surgical procedure. In this case the registration performed in steps 206-218 can be performed in real-time or near real-time as the 2D medical image is received in order to fuse the pre-operative 3D volume data with the live 2D medical images acquired during the surgical procedure. The registration can then be repeated for each newly acquired 2D medical image during the surgical procedure. The 2D medical image can be received directly from an image acquisition device (e.g., X-ray device) or can be received by loading a previously acquired 2D medical image of the patient.

At step 206, a DRR is rendered from the 3D medical volume based on current transformation parameters. The DRR is a synthetically generated 2D image rendered as a projection image of the 3D volume. the DRR can be rendered using the current transformation parameters and perspective geometries of the X-ray imaging system using the X-ray imaging model of Equation (1). The first time the method performs step 206, the initial DRR can be generated using randomly initialized transformation parameters or predetermined initial transformation parameters.

At step 208, the trained multi-agent DNN is applied to multiple ROIs in the DRR and the 2D medical image to calculate a respective set of action-values for each ROI. The multi-agent DNN applies a respective agent to each of the multiple ROIs to predict the action-values for each of the possible actions from each ROI. In an advantageous embodiment, the multi-agent DNN is a dilated FCN trained as discussed above. The FCN includes an encoder FCN and a decoder FCN. The encoder FCN inputs the 2D medical image and the DRR and encodes densely overlapping ROIs in the 2D medical image and the DRR into dense feature vector maps, in which each feature vector represents a respective predetermined size (e.g., 61×61 pixels) ROI. In an advantageous implementation, the encoder FCN encodes ROIs centered at each pixel in the X-ray image and DRR into the dense feature vector maps. The decoder FCN decodes the feature vector corresponding to each ROI and outputs a respective set of action-values for the set of possible actions for each ROI. In an advantageous implementation, the FCN decoder outputs a dense reward map in which each pixel location includes the respective set of action-values for the ROI centered at that pixel location in the 2D medical image and the DRR. In an advantageous implementation, the dense reward map has 12 channels, such that the set of action-values at each pixel location in the dense reward map has action-values for each of the 12 possible actions. Accordingly, the dense reward map includes the action-value predictions associated with each of the multiple agents based on a corresponding ROI.

At step 210, a proposed action associated with each ROI/agent is determined. The trained DNN calculates action-values for all of the possible actions for each ROI. The proposed action associated with each agent is selected from the set of possible actions as the action with the highest action value calculated for the corresponding ROI. Thus, a respective proposed action is associated with each of the multiple agents/ROIs.

At step 212, an auto attention mechanism is applied to select a subset of agents/ROIs, and the proposed actions associated with the selected subset of agents/ROIs are aggregated. Since X-ray images during surgery and interventions can have very different fields of view and contain many structures that do not match with the 3D volume (e.g., medical devices), there can be many ROIs without reliable visual cues for registration. Such an ROI can significantly downgrade the performance of the agent observing it, which makes selection of selection of the ROI a critical problem for single-agent 3D/3D registration. According to an advantageous embodiment of the present invention, the multi-agent based registration utilizes an auto attention mechanism to cope with the problem of ROI selection (i.e., which ones of the multiple ROIs to use to provide the best registration). In an advantageous embodiment, the FCN policy network is applied on the 2D medical image and the DRR to generate a dense reward map, which contains estimated rewards for agents with all possible ROIs from the input images, denoted as $R_i(A)$, where i is the index of the agent and $A \in \mathcal{A}$ is the action. For every agent, the maximum reward is calculated and the action associated with it is selected:

$$\hat{R}_i = \max_{A \in \mathcal{A}} R_i(A), \qquad (11)$$
$$A_i = \operatorname{argmax}_{A \in \mathcal{A}} R_i(A).$$

Figure 7:
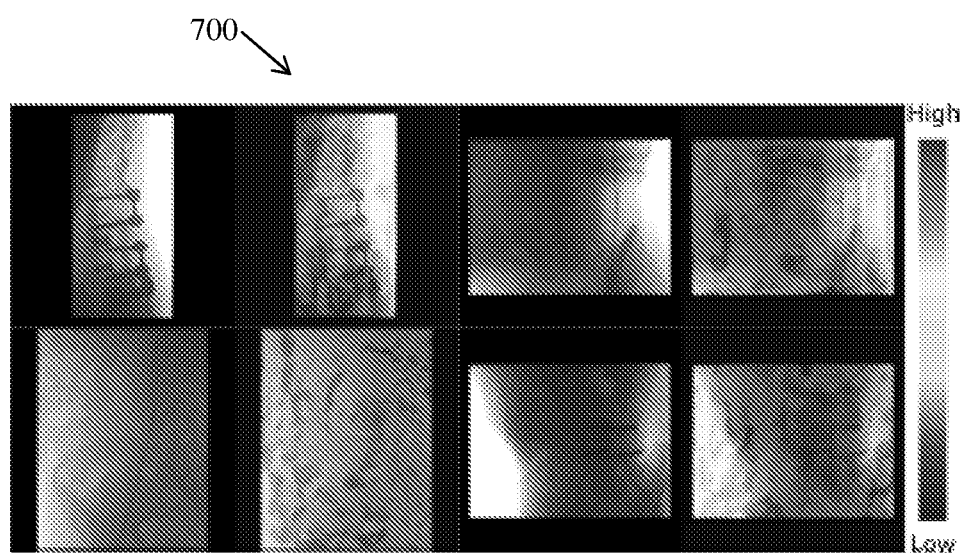
FIG. 7 illustrates a confidence map 700 of densely overlapping ROIs within an X-ray image.

Since $\hat{R}_i$ is the anticipated reward of its selected action $A_i$, it represents the agent's confidence in the selected action. Accordingly, the maximum reward (i.e., the action-value of the proposed action) for each agent is used as a confidence value for that agent/ROI. FIG. 7 illustrates a confidence map 700 of densely overlapping ROIs within an X-ray image. In the confidence map 700, the color of each pixel indicates the confidence value from the ROI centered on that pixel. When viewed in color, the confidence map 700 of FIG. 7 shows a strong correlation between the confidence score $\hat{R}_i$ and the quality of the corresponding ROI. For example, for an image with a large field of view, the confidence score is high on the spine (i.e., good visual clue for registration) and low on soft tissue. When severe occlusion is presented due to medical devices, the occluded area has low confidence scores.

The confidence score $\hat{R}_i$ is used to derive an attention mechanism to keep a subset of agents, denoted as $\mathcal{J}$, with $\hat{R}_i$ values that rank in a top predetermined percentage. In an advantageous implementation, agents with $\hat{R}_i$ ranked in the top 25% are selected to be in the subset of agents $\mathcal{J}$. The proposed actions from the selected subset of agents are aggregated, by finding the geodesic mean of the proposed actions on SE(3):

$$\hat{A} = \operatorname*{argmin}_{A \in SE(3)} \sum_{i \in \mathcal{J}} \|\log(A_i \circ A^{-1})\|_F, \qquad (12)$$

which can be solved using Gradient Descent. Thus, the proposed actions from the selected subset of agents are aggregated to select an optimal registration action corresponding to an optimal adjustment of the transformation parameters for the current iteration.

At step 214, the transformation parameters of the 3D medical volume are updated by applying the selected action. As discussed above, in an advantageous implementation, the selected action resulting from aggregating the proposed actions from the selected subset of agents is one of a set of possible actions including, adjusting the translation along the x, y, or z axis by ±1 mm or adjusting the rotation about the x, y, or z axis by 1 degree.

At step 216, it is determined whether a stop condition is met. For example, the stop condition can be met when it is determined that the transformation parameters have converged to a correct pose or when a predetermined maximum number of iterations have been performed. If the stop condition has not been met, the method returns to step 206 and repeats steps 206-216. Accordingly steps 206-216 are repeated until the stop condition is met. In an embodiment in which the stop condition is based on a determination of whether the transformation parameters have converged to a correct pose, this determination may involve rendering a new DRR based on the updated transformation parameters and comparing the new DRR and the 2D medical image to determine an error between the new DRR and the 2D medical image. In this case, since the determination in step 216 involves rendering a new DRR, the method may return to step 208 instead of step 206. When the stop condition is met, the method proceeds to step 218.

At step 218, the registration result is output. The 3D medical volume is transformed by the transformation to register the 3D medical volume to the 2D medical image. The 2D/3D registration results can be output by displaying the registered 3D volume (or a DRR rendered from the 3D volume) and the 2D medical image on a display of a computer system. For example, the image data from 3D volume can be overlaid on the 2D medical image and displayed as a fused image. The 2D/3D registration results can also be output by electronically transmitting the 2D/3D registration results to a remote computer system to be displayed on a display of the remote computer system.

The present inventors applied the above described method on a clinical application of 2D/3D registration during minimally invasive spine surgery, which aims at registering the spine in cone-beam CT (CBCT) and two X-ray images acquired from different angles. This is a challenging problem because surgical objects like screws and guide wires can be presented separately in the 3D and 2D images, creating severe image artifacts and occlusion of the target object. Images 101, 102, 103, and 104 of FIG. 1 show examples of such X-ray images.

During minimally invasive spine surgery the initial pose offset between the CBCT and the X-ray images can be up to 20 mm in translation and 10 degrees in rotation. Therefore, the agents were trained to perform registration starting from within this range. In particular, the X-ray image and DRR pairs used for training have random rotation offset up to 10 degrees, and the DRR feature map is randomly shifted up to 20 mm during training. The training data was generated from 100 rotational run data sets, where 180 pairs of X-ray image and DRR are extracted from each data set. Since the number of rotational run data is limited, pairs of synthetic X-ray images and DRRs were also generated from each CT. In total, the training data 50,000 data samples, 18,000 rotational run data and 32,000 synthetic data.

To evaluate the contribution of the multi-agent strategy, the present inventors tested the agent-based method in two modes: 1) using a single agent with an ROI at the center of the image, referred to as agt-s, and 2) using the above described multi-agent method, referred to as agt-m. The agent-based method was also compared with two optimization based methods. The first method, referred to as opt-local, is a standard optimization-based method that performs local optimization over Gradient Correlation (GC) using Powell's method. The second method, referred to as opt-global, is a state-of-the-art method recently proposed in De Silva et al., "3d-2d Image Registration for Target Localization in Spine Surgery: Investigation of Similarity Metrics Providing Robustness to Content Mismatch," *Physics in Medicine and Biology* 61(8):3009, 2016, which performs semi-global optimization over Gradient Orientation using a multistart strategy. The present inventors also tested a combination of agt-m and opt-local, referred to as agt-m-opt, where local optimization of GC is applied starting from the result of agt-m. To apply the above describe method on 2D/3D registration with two X-ray images, in every step, one action is obtained from each X-ray image, and the obtained actions are applied sequentially. Registration error is measured by Target Registration Error (TRE) which is calculated as the Root Mean Square Error of the locations of seven spine landmarks.

Testing was first performed on 16 unseen rotational run data. On each of the 16 testing data sets, 100 pairs of X-ray images that are >60 degrees apart (common practice for spine surgery) were randomly selected, and 2D/3D registration was performed on each pair, starting from a perturbation of the ground truth transformation within 20 mm translation and 10 degrees rotation, leading to 1600 test cases. Note that these rotational run data have a relatively low SNR with a faint spine, as shown in images 105 and 106 of FIG. 1.

Experiment results are summarized in Table 2. In Table 2, success rate accounts for test cases with TRE<10 mm and µTRE is the average TRE of successful test cases. The local optimization-based method resulted in very low robustness (i.e., TRE>10 mm is considered as failure), mainly due to the non-convexity of the optimization problem. By employing the semi-global optimization, opt-global achieved much higher robustness, but the result is still not satisfactory. In comparison, agt-m achieved a high robustness (>99% success rate). Comparison of agt-s and agt-m shows that the multi-agent strategy can noticeably improve robustness by aggregating information from the most confident agents. The average TRE calculated on successful test cases (with TRE<10 mm) shows that while the agent-based method provides high robustness, its accuracy on successful test cases in lower than that of the optimization-based methods. This is primarily due to the discrete actions of 1 mm and 1 degree, and location information loss during stride in the CNN. By applying opt-local to refine agt-m, agt-m-opt achieved both high robustness and high accuracy.

TABLE 2

| Method | Success Rate | µTRE | 90% TRE | Run Time |
|---|---|---|---|---|
| opt-local | 28.2% | 2.33 mm | 28.65 mm | 3.6 s |
| opt-global | 69.9% | 1.27 mm | 24.29 mm | 37.1 s |
| agt-s | 93.8% | 4.00 mm | 6.86 mm | 0.8 s |
| agt-m | 99.2% | 2.89 mm | 4.84 mm | 2.1 s |
| agt-m-opt | 99.2% | 1.38 mm | 2.43 mm | 2.9 s |

To evaluate the above described method in a real clinical setup, the present inventors further tested the method on 28 clinical data sets collected from minimally invasive spine surgery. Each data set contains a CBCT acquired before the surgery and two X-ray images acquired during the surgery. Ground truth registration was manually annotated. On each clinical data set, 20 perturbations of the ground truth transformation were randomly generated as starting positions for 2D/3D registration, leading to 460 test cases.

Experimental results on clinical data are summarized in Table 3. A higher µTRE is reported for all methods on clinical data than on rotational run data, primarily due to three reasons: 1) The ground truth registration for clinical data is manually annotated, which could bear 1~2 mm error; 2) The complexity of the clinical data is much higher than rotational run data (i.e., artifacts and occlusion caused by surgical devices, varying imaging field of view, etc.); 3) The agent is trained without using any real clinical data from spine surgery. The present inventors observed that due to the increased complexity, the heuristically selected ROI used in agt-s (i.e., center of the image) became even less reliable. As a result, the robustness of agt-s degrades significantly as compared to that on the rotational run data. The multi-agent method, agt-m, in contrast achieved a much higher robustness than agt-s, even though the multi-agent policy network is trained without using any clinical data from spine surgery, demonstrating the effectiveness of the multi-agent strategy in dealing with complex scenarios.

TABLE 3

| Method | Success Rate | µTRE | 90% TRE | Run Time |
|---|---|---|---|---|
| opt-local | 17.5% | 3.94 mm | 28.46 mm | 3.6 s |
| opt-global | 57.3% | 2.59 mm | 25.61 mm | 37.1 s |
| agt-s | 72.7% | 4.71 mm | 25.31 mm | 0.8 s |
| agt-m | 91.8% | 5.11 mm | 9.81 mm | 2.1 s |
| agt-m-opt | 94.6% | 2.70 mm | 8.72 mm | 2.9 s |

Adaptive Loss Function

In a possible embodiment, the training of the policy network for 2D/3D image registration may be adapted to be utilize an adaptive loss function. In particular, the Adaloss method that utilizes an adaptive loss function for landmark estimation could be modified for use in training the policy network for 2D/3D medical image registration. The Adaloss method uses an adaptive learning procedure coupled with existing gradient descent methods to effectively train image to image networks for a landmark regression problem. The Adaloss method progressively changes/adapts the objective function during training. Instead of starting training to regress a Gaussian distribution with a small sigma, the Adaloss method starts by training a network to regress a Gaussian with a large sigma (standard deviation), and iteratively decreases the sigma based on the loss values over past epochs. This approach is easy to incorporate into existing training pipelines and helps to address a sample bias problem and prevents the network from regressing an empty heat map for landmark estimation, which is a common problem. This approach is less sensitive to learning rates, trains faster, and enables achieving high accuracy and precision or existing benchmarks. The effectiveness of the Adaloss method was generated by the present inventors on MPII, a popular human body pose estimation dataset, and CathDet, a medical dataset of fluoroscopy scans (X-ray images) where the task is to produce a single landmark with high precision.

Figure 8:
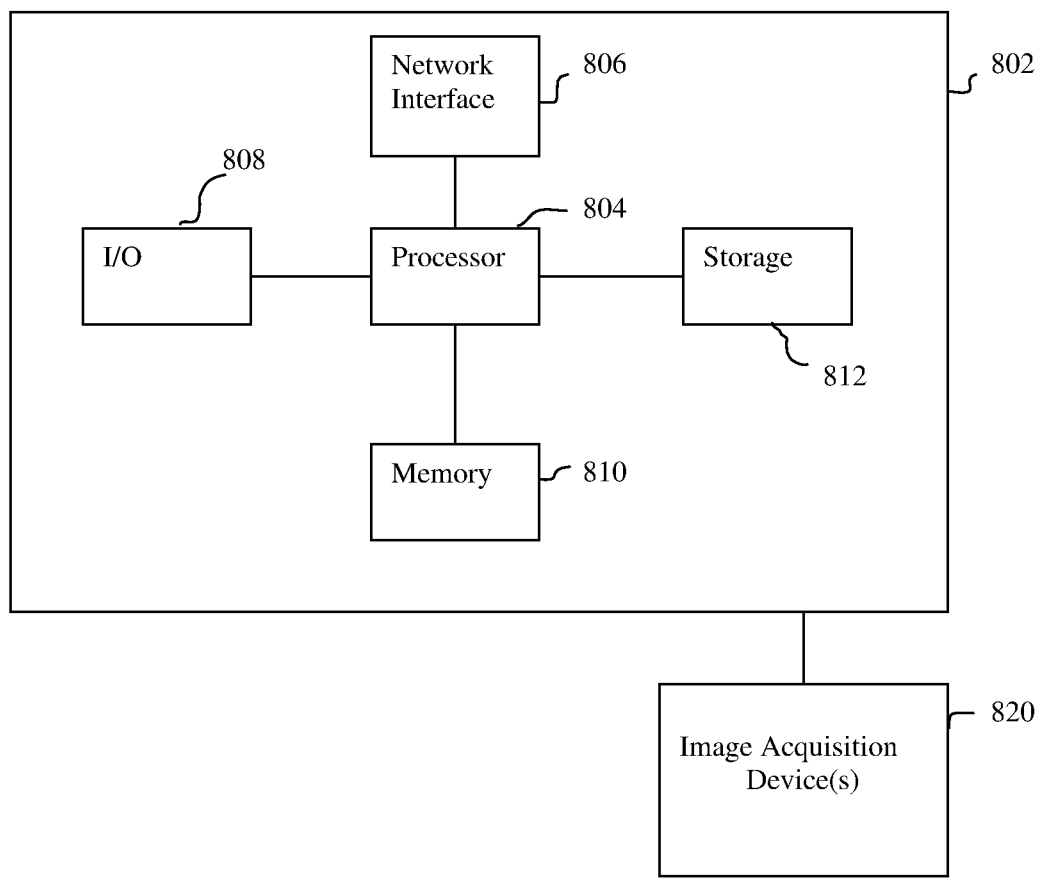
FIG. 8 is a high-level block diagram of a computer capable of implementing the present invention.

The above-described methods for 2D/3D medical image registration can be implemented on one or more computers using well-known computer processors, memory units, storage devices, computer software, and other components. A high-level block diagram of such a computer is illustrated in FIG. 8. Computer 802 contains a processor 804, which controls the overall operation of the computer 802 by executing computer program instructions which define such operation. The computer program instructions may be stored in a storage device 812 (e.g., magnetic disk) and loaded into memory 810 when execution of the computer program instructions is desired. Thus, the method steps illustrated in FIGS. 2, 3, 4, and 5 may be defined by the computer program instructions stored in the memory 810 and/or storage 812 and controlled by the processor 804 executing the computer program instructions. One or more image acquisition devices 820, such as a CT scanning device, X-ray acquisition device, C-arm image acquisition device, MR scanning device, Ultrasound device, etc., can be connected to the computer 802 to input image data to the computer 802. It is possible that the computer and one or more of the image acquisition devices 820 may be implemented as one device. It is also possible that the image acquisition devices 820 and the computer 802 communicate wirelessly through a network or wireless communication protocol. In a possible embodiment, the computer 802 may be located remotely with respect to the image acquisition devices 820 and may perform some or all of the method steps of FIGS. 2, 3, 4, and 5 as part of a server or cloud based service. The computer 802 also includes one or more network interfaces 806 for communicating with other devices via a network. The computer 802 also includes other input/output devices 908 that enable user interaction with the computer 802 (e.g., display, keyboard, mouse, speakers, buttons, etc.). One skilled in the art will recognize that an implementation of an actual computer could contain other components as well, and that FIG. 8 is a high level representation of some of the components of such a computer for illustrative purposes.

The above described methods for 2D/3D medical image registration and/or training a deep neural network for 2D/3D medical image registration may be implemented in network-based cloud computing system. In such a network-based cloud computing system, a server communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. Certain steps of the above described methods may be performed by a server or by other computers/processors in the network-based cloud-computing system. Certain steps of the above described methods may be performed locally by a client computer in a network-based cloud computing system. The steps of the above described methods for intelligent artificial agent based image registration and/or training deep neural networks may be implemented in network-based cloud computing system may be performed by the network-based cloud-computing system or by a local client computer in any combination.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for automated computer-based registration of a 3D medical volume to a 2D medical image, comprising:
    rendering a 2D digitally reconstructed radiograph (DRR) from the 3D medical volume based on current transformation parameters;
    determining, by an intelligent artificial agent, an action-value for each of a plurality of possible actions based on a region of interest (ROI) in the DRR and a ROI in the 2D medical image, the plurality of possible actions corresponding to predetermined adjustments of the current transformation parameters, the plurality of possible actions including positive and negative translations along x, y, and z axes by a predetermined amount and positive and negative rotations about the x, y, and z axes by a predetermined amount;
    selecting an action from the plurality of possible actions based on the action-values;
    adjusting the current transformation parameters by applying the selected action to provide adjusted transformation parameters;
    repeating the rendering, the determining, the selecting, and the adjusting steps for a plurality of iterations using the adjusted transformation parameters as the current transformation parameters; and
    registering the 3D medical volume to the 2D medical image using the adjusted transformation parameters resulting from the plurality of iterations.

2. The method of claim 1, wherein determining, by an intelligent artificial agent, an action-value for each of a plurality of possible actions based on a region of interest (ROI) in the DRR and a corresponding ROI in the 2D medical image comprises:
    encoding a region of interest (ROI) in the DRR using a first convolutional neural network (CNN) to generate a first feature vector and separately encoding a corresponding ROI in the 2D medical image using a second CNN to generate a second feature vector;
    concatenating the first feature vector and the second feature vector into a concatenated feature vector; and
    decoding the concatenated feature vector to determine the action-value for each of the plurality of possible actions.

3. The method of claim 2, wherein the first CNN and the second CNN have the same structure.

4. The method of claim 1, wherein selecting an action from the plurality of possible actions based on the action-values comprises:
selecting the action from the plurality of possible actions having a highest action-value.

5. The method of claim 1, wherein the ROI in the DRR and the ROI in the 2D medical image are centered at a location of the intelligent artificial agent.

6. The method of claim 1, wherein the ROI in the DRR corresponds to the ROI in the 2D medical image.

7. The method of claim 1, wherein the 3D medical volume is a CT (computed tomography) volume and the 2D medical image is an x-ray image.

8. An apparatus for automated computer-based registration of a 3D medical volume to a 2D medical image, comprising:
a processor; and
a memory storing computer program instructions, which when executed by the processor cause the processor to perform operations comprising:
rendering a 2D digitally reconstructed radiograph (DRR) from the 3D medical volume based on current transformation parameters;
determining, by an intelligent artificial agent, an action-value for each of a plurality of possible actions based on a region of interest (ROI) in the DRR and a ROI in the 2D medical image, the plurality of possible actions corresponding to predetermined adjustments of the current transformation parameters, the plurality of possible actions including positive and negative translations along x, y, and z axes by a predetermined amount and positive and negative rotations about the x, y, and z axes by a predetermined amount;
selecting an action from the plurality of possible actions based on the action-values;
adjusting the current transformation parameters by applying the selected action to provide adjusted transformation parameters;
repeating the rendering, the determining, the selecting, and the adjusting steps for a plurality of iterations using the adjusted transformation parameters as the current transformation parameters; and
registering the 3D medical volume to the 2D medical image using the adjusted transformation parameters resulting from the plurality of iterations.

9. The apparatus of claim 8, wherein determining, by an intelligent artificial agent, an action-value for each of a plurality of possible actions based on a region of interest (ROI) in the DRR and a corresponding ROI in the 2D medical image comprises:
encoding a region of interest (ROI) in the DRR using a first convolutional neural network (CNN) to generate a first feature vector and separately encoding a corresponding ROI in the 2D medical image using a second CNN to generate a second feature vector;
concatenating the first feature vector and the second feature vector into a concatenated feature vector; and
decoding the concatenated feature vector to determine the action-value for each of the plurality of possible actions.

10. The apparatus of claim 9, wherein the first CNN and the second CNN have the same structure.

11. The apparatus of claim 8, wherein selecting an action from the plurality of possible actions based on the action-values comprises:
selecting the action from the plurality of possible actions having a highest action-value.

12. The apparatus of claim 8, wherein the ROI in the DRR and the ROI in the 2D medical image are centered at a location of the intelligent artificial agent.

13. A non-transitory computer readable medium storing computer program instructions for automated computer-based registration of a 3D medical volume to a 2D medical image, wherein the computer program instructions when executed by a processor cause the processor to perform operations comprising:
rendering a 2D digitally reconstructed radiograph (DRR) from the 3D medical volume based on current transformation parameters;
determining, by an intelligent artificial agent, an action-value for each of a plurality of possible actions based on a region of interest (ROI) in the DRR and a ROI in the 2D medical image, the plurality of possible actions corresponding to predetermined adjustments of the current transformation parameters, the plurality of possible actions including positive and negative translations along x, y, and z axes by a predetermined amount and positive and negative rotations about the x, y, and z axes by a predetermined amount;
selecting an action from the plurality of possible actions based on the action-values;
adjusting the current transformation parameters by applying the selected action to provide adjusted transformation parameters;
repeating the rendering, the determining, the selecting, and the adjusting steps for a plurality of iterations using the adjusted transformation parameters as the current transformation parameters; and
registering the 3D medical volume to the 2D medical image using the adjusted transformation parameters resulting from the plurality of iterations.

14. The non-transitory computer readable medium of claim 13, wherein determining, by an intelligent artificial agent, an action-value for each of a plurality of possible actions based on a region of interest (ROI) in the DRR and a corresponding ROI in the 2D medical image comprises:
encoding a region of interest (ROI) in the DRR using a first convolutional neural network (CNN) to generate a first feature vector and separately encoding a corresponding ROI in the 2D medical image using a second CNN to generate a second feature vector;
concatenating the first feature vector and the second feature vector into a concatenated feature vector; and
decoding the concatenated feature vector to determine the action-value for each of the plurality of possible actions.

15. The non-transitory computer readable medium of claim 14, wherein the first CNN and the second CNN have the same structure.

16. The non-transitory computer readable medium of claim 13, wherein the ROI in the DRR corresponds to the ROI in the 2D medical image.

17. The non-transitory computer readable medium of claim 13, wherein the 3D medical volume is a CT (computed tomography) volume and the 2D medical image is an x-ray image.

* * * * *